(12) United States Patent
Schuldt et al.

(10) Patent No.: US 10,027,199 B2
(45) Date of Patent: Jul. 17, 2018

(54) PUMP UNIT

(71) Applicant: GRUNDFOS HOLDING A/S, Bjerringbro (DK)

(72) Inventors: Christian Schuldt, Reinfeld (DE); Carl-Christian Danielsen, Ryomgård (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 399 days.

(21) Appl. No.: 14/655,374

(22) PCT Filed: Dec. 20, 2013

(86) PCT No.: PCT/EP2013/077599
§ 371 (c)(1),
(2) Date: Jun. 25, 2015

(87) PCT Pub. No.: WO2014/102173
PCT Pub. Date: Jul. 3, 2014

(65) Prior Publication Data
US 2015/0372557 A1    Dec. 24, 2015

(30) Foreign Application Priority Data
Dec. 27, 2012 (EP) .................................. 12199518

(51) Int. Cl.
*H02K 5/22* (2006.01)
*F04D 13/06* (2006.01)
(Continued)

(52) U.S. Cl.
CPC ............... *H02K 5/22* (2013.01); *F04D 13/06* (2013.01); *F04D 13/0686* (2013.01);
(Continued)

(58) Field of Classification Search
CPC .......... H02K 5/225; H02K 11/33; H02K 5/22; H02K 11/30; F04D 13/06; F04D 25/06;
(Continued)

(56) References Cited

U.S. PATENT DOCUMENTS 4,668,898 A * 5/1987 Harms .................... H02K 29/06
310/227
5,327,064 A * 7/1994 Arakawa ................ H02K 29/08
307/117
(Continued)

FOREIGN PATENT DOCUMENTS

CN    2550951 Y    5/2003
CN    101589237 A    11/2009
(Continued)

*Primary Examiner* — Mohamad Musleh
(74) *Attorney, Agent, or Firm* — McGlew and Tuttle, P.C.

(57) ABSTRACT

A pump assembly with an electric motor which includes a stator housing (6) and an electronics housing (4; 50) fastened at the outside on the stator housing (6). The electronics housing (4; 50) is connected to the stator housing (6) via at least one fastening element (24, 24'; 56). The fastening element is situated within an outer contour of the electronics housing (4; 50) which is delimited by the outer walls of the electronics housing (4; 50) and is accessible even with a closed electronics housing (4; 50).

16 Claims, 7 Drawing Sheets

(51) Int. Cl.
  *F04D 29/58* (2006.01)
  *F04D 25/06* (2006.01)
  *F04D 29/18* (2006.01)
  *F04D 29/26* (2006.01)
  *F04D 29/40* (2006.01)
  *H02K 11/30* (2016.01)
  *H02K 11/33* (2016.01)

(52) U.S. Cl.
  CPC ............ *F04D 25/06* (2013.01); *F04D 29/18* (2013.01); *F04D 29/26* (2013.01); *F04D 29/40* (2013.01); *F04D 29/5806* (2013.01); *H02K 5/225* (2013.01); *H02K 11/30* (2016.01); *H02K 11/33* (2016.01)

(58) Field of Classification Search
  CPC ...... F04D 29/18; F04D 29/26; F04D 13/0686; F04D 29/5806; F04D 29/40
  See application file for complete search history.

(56) References Cited

U.S. PATENT DOCUMENTS

| | | | |
|---|---|---|---|
| 5,932,942 A * | 8/1999 | Patyk | H02K 11/33 310/58 |
| 6,028,386 A | 2/2000 | Kech et al. | |
| 9,231,446 B2 * | 1/2016 | Soma | H02K 3/50 |
| 2007/0063603 A1 * | 3/2007 | Levine | D06F 37/206 310/85 |
| 2009/0021091 A1 * | 1/2009 | Shiino | B62D 5/0406 310/71 |
| 2010/0090635 A1 | 4/2010 | Andersen et al. | |
| 2012/0161558 A1 | 6/2012 | Yamasaki et al. | |
| 2012/0286605 A1 * | 11/2012 | Miyachi | B62D 5/0406 310/71 |
| 2013/0343935 A1 * | 12/2013 | Hoj | F04D 13/0606 417/423.7 |
| 2014/0056741 A1 * | 2/2014 | Stentoft | H02K 5/225 417/423.13 |
| 2015/0326093 A1 * | 11/2015 | Olsen | H02K 5/225 417/423.7 |

FOREIGN PATENT DOCUMENTS

| | | |
|---|---|---|
| CN | 102570723 B | 1/2015 |
| DE | 100 65 796 A1 | 5/2002 |
| JP | 2005188296 A | 7/2005 |

* cited by examiner

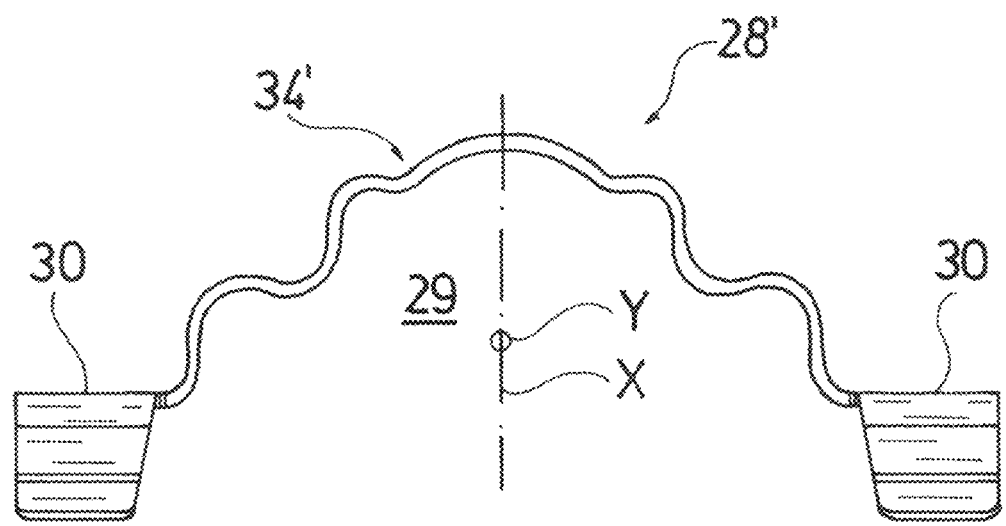
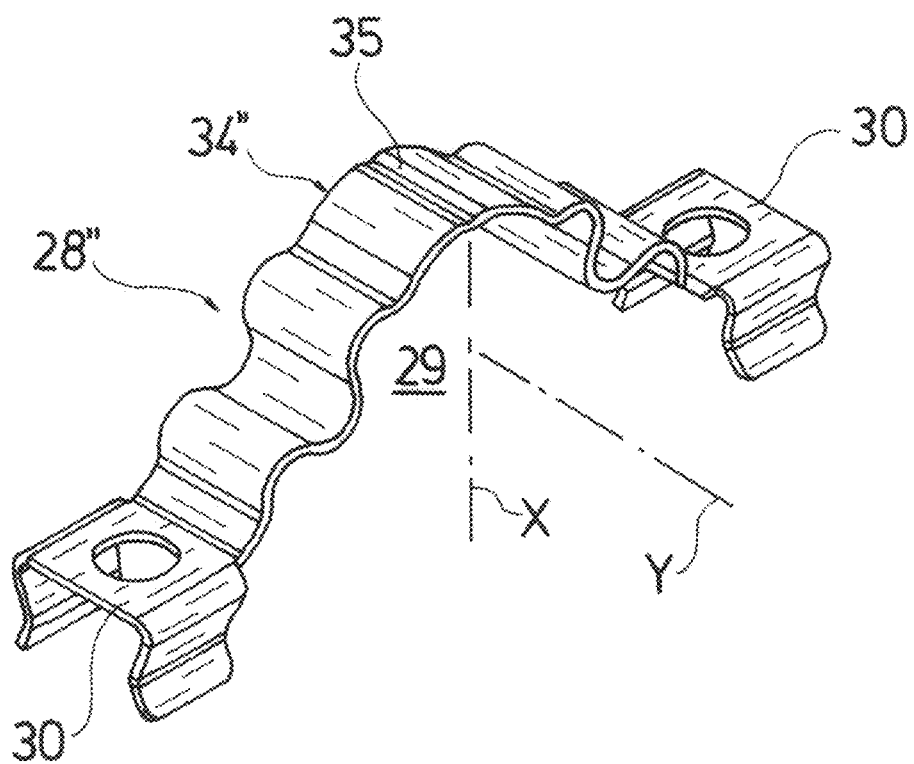

PUMP UNIT

CROSS REFERENCE TO RELATED APPLICATIONS

This application is a United States National Phase Application of International Application PCT/EP2013/077599 filed Dec. 20, 2013 and claims the benefit of priority under 35 U.S.C. § 119 of European Patent Application EP 12199518.7 filed Dec. 27, 2012, the entire contents of which are incorporated herein by reference.

FIELD OF THE INVENTION

The invention relates to a pump assembly with an electric motor comprising a stator housing and an electronics housing fastened at the outside on the stator housing.

BACKGROUND OF THE INVENTION

With known pump assemblies, mostly an electric motor is arranged in a stator housing attached on a pump housing. At least one impeller which is located in the pump housing is driven by the electric motor. Usually, an electronics housing or terminal box, in which the electrical connections and electrical components are located, in order to activate and/or regulate the electric motor, is screwed on the stator housing.

With the assembly of the pump assembly, the electronics housing is screwed with its lower part to the stator housing. Thereafter, a cover is applied onto the lower part, and typically the cover is then screwed to the lower part. The disadvantage of this embodiment is the fact that very many working steps are necessary in the final assembly and simultaneously the electronics housing is stored and handled in an open manner before the final assembly, so that a damage to the electronics arranged in the electronics housing cannot be ruled out.

SUMMARY OF THE INVENTION

Against this background, it is an object of the invention to improve a pump assembly to the extent that the electronics housing is simpler to assemble and the danger of any damage to the electrical components in the electronics housing is reduced.

With the pump assembly according to the invention, having an electric motor comprising a stator housing and an electronics housing fastened at the outside on the stator housing, the electronics housing is connected to the stator housing via at least one fastening element, said fastening element being situated within an outer contour of the electronics housing which is delimited by the outer walls of the electronics housing, and being accessible when the electronics housing is closed. What is essential to the invention is the fact that the terminal box or the electronics housing is fastened on the stator housing by a fastening element, such that the fastening element is accessible from the outside given a closed electronics housing. This means that the electronics housing does not need to be opened for fastening, as is the case with conventional electronics housings. In particular, this means that the interior of the electronics housing, in which electrical and/or electronic components are arranged, does not need to be opened for fastening. According to the invention, the fastening element is accessible from the outer side of the electronics housing when the electronics housing is closed, wherein this does not mean that the fastening element cannot be covered by a cover element such as for example a cover cap when not in use. In particular, such a cover cap can also serve for sealing an opening for the fastening element. For actuating the fastening element, such a cover element can then be removed, without having to open the electronics housing itself. Despite this, the electronics housing according to the invention is designed such that the fastening element is situated within the outer contour delimited by the outer walls of the electronics housing, i.e. does not project outwards beyond the outer contour of the electronics housing. This on the one hand improves the optical impression of the electronics housing and on the other hand, by way of this design, it is ensured that the fastening element or the fastening elements cannot inadvertently get damaged on handling and storage. With regard to the fact that the fastening element is situated within the outer contour, this does not however mean that it is covered by the outer wall. Rather, the at least one fastening element is arranged such that it is accessible from the outside for fastening the electronics housing on the stator housing, for example through an opening in the wall of the electronics housing. In contrast to the state of the art, it is therefore possible according to the invention, to fasten the electronics housing which is already closed before the assembly, on the stator housing with the at least one fastening element from the outside, and if necessary or desired, to also preferably release it again. The electronics housing can thus be assembled as a completely preassembled construction unit or module. Thus, one prevents parts, for example electrical components which are located in the electronics housing, from becoming damaged with the final assembly of the electronics housing.

A preferred embodiment envisages the electronics housing comprising at least one base part and a cover part, wherein the at least one fastening element is arranged a manner such that the cover part is releasable from the base part independently of the fastening element. This means that the cover part can be removed from the base part, without having to separate the electronics housing from the stator housing. Thus, although the electronics housing can be assembled on the stator housing in the closed condition, since the fastening element is accessible from the outside in the closed condition, the electronics housing despite this can also be opened in the assembled condition. Thus, it is often advantageous to be able to intervene in the electronics housing, for example in order to carry out repair or maintenance, without having to release the complete electronics housing from the stator housing.

A further preferred embodiment envisages the electronics housing having a base surface which on at least one side extends beyond an outer contour of the stator housing and is preferably larger than an adjacent outer side of the stator housing. This means that the electronics housing preferably extends in the direction of its base which is adjacent to the outer side of the stator housing, beyond the outer contour of the stator housing in at least one direction. Preferably thereby, the base surface which is formed by the base is larger than this adjacent outer side of the stator housing. Thus, the electronics housing for example can be applied onto the stator housing at the axial side and have a base surface or floor surface transverse to the longitudinal axis of the stator, which is greater than the axial face side of the stator housing. For example, the electronics housing to a radial side can project beyond the stator housing or however to several axial sides or over the whole periphery beyond the stator housing. In the case that the electronics housing is applied onto the stator housing at the radial side or peripheral side, the stator housing for example can extend in the radial direction beyond a face-end of the stator housing. Alternatively or additionally, the electronics housing can extend in the tangential direction beyond the extension of the stator housing, for example have a greater width in the tangential direction than the diameter of the stator housing. Thus, adequate space for necessary electronic components and/or connections can be achieved within the electronics housing, of which components and/or connections at least a few are preferably arranged on at least one circuit board in the electronics housing.

Moreover, it can be advantageous if the electronics housing is fastened axially on the stator housing. The axial direction is thereby defined by the longitudinal or rotation axis of the rotor arranged in the stator housing. The axial arrangement of the electronics housing means that the electronics housing is applied onto an axial face side of the stator housing, preferably onto an axial face side which is away from a pump housing. The axial or axial-side arrangement of the electronics housing on the stator housing can simplify the operation or a reading of display elements and operating elements present on the electronics housing.

A further preferred design envisages the fastening element engaging through the electronics housing transversely, in particular perpendicularly to the longitudinal axis of the stator. Such an arrangement of the at least one fastening element has the advantage that the electronics housing at least in part regions can be kept free of fastening elements engaging axially through the electronics housing. Thus, the fastening element can be arranged for example in the proximity of the base of the electronics housing and engage into the electronics housing transversely to the longitudinal axis of the stator housing. Thus, the interior of the electronics housing which is further away from the base remains free of the fastening element, so that a circuit board for example there can extend transversely to the longitudinal axis, without fastening elements having to engage through this circuit board. For example, it is thus also possible to arrange a large display on the upper side or the cover of the electronics housing, said cover or upper side being away from the stator housing, since no fastening elements then need to be arranged in this region. Such a display can then in particular have an extension which in projection essentially corresponds to the area of the stator housing arranged below the electronics housing, for example of the axial face side of the stator housing given an axial arrangement of the electronics housing. The electronics housing can thus take up this complete space since no fastening elements need to be arranged on the cover of the electronics housing.

It is further preferable if the cover part and the base part of the electronics housing are screwed to one another. This has the advantage that the electronics housing can be opened without any problem, for example for repair purposes, since thus a releasable connection is created between the cover part and the base part. The base part and the cover part of the electronics housing can however also be connected to one another in a different manner, for example by way of locking-in. Preferably, the electronics housing is closed at least in a splash-proof manner, in order to prevent the penetration of liquids into the housing. Thus, a seal is preferably arranged between the cover part and the base part and can be fixedly connected to the cover part and/or to the base part, for example directly molded on with injection molding.

A particularly preferred embodiment includes the base part being fastened on the stator housing with at least one screw as a fastening element, preferably with two screws, and the cover part comprising at least one opening lying opposite the screw in the direction of its longitudinal axis, wherein the space between the screw and the opening is free. This means that no further components are arranged in the inside of the electronics housing between the screw and the opening in the cover part, so that a free space exists between the screw and the opening. Ideally, this free space extends in the axial projection in the direction of the screw longitudinal axis, from the opening to the screw. This permits the screw, when the electronics housing is closed, to be able to be inserted through the opening, and/or for a screw tool to be able to be inserted through the opening, in order to rotate the screw and thus to screw the closed electronics housing to the stator housing. The opening and the region between the opening and the screw and which is kept free, thus permit the access to the screw, without having to previously remove the cover part from the base part for this. This is particularly advantageous on assembly, since with this, the electronics housing which is preassembled from the cover part and the base part can be screwed with at least one screw led through the mentioned opening in the cover part and through the mentioned free space, to the stator housing. The fastening via two screws has the advantage that a more stable and rotationally fixed connection can be created with this. Moreover, several support points between the electronics housing and the stator housing can be present, wherein these support points preferably do not bear on the fastening points of the screws or close to these fastening points. Thus, the electronics housing can be supported on the stator housing at several support points which are preferably distanced to one another, so that a tilt-resistant bearing contact of the electronics housing on the stator housing is realized. Additionally to the screw connections, it can be advantageous if the electronics housing and the stator housing mutually clamp, hook and/or lock into one another, e.g. by way of suitable projections and/or recesses.

The screws which fasten the electronics housing on the stator housing are preferably arranged in the electronics housing such that they fix a lower part or base part of the electronics housing on the stator housing, but do not come into fixing engagement with a cover part of the electronics housing which closes the lower part. The cover part is thus connected to the base part independently of the screws for fastening the electronics housing on the stator housing. This has the advantage that the electronics housing can be opened independently of its fastening on the stator housing. I.e. the cover part can be removed from the base part without having to release the screws which fix the electronics housing or its lower part on the stator housing.

Furthermore, it is preferable if the at least one opening in the cover part is covered by cover film which is arranged on the side of the cover part which is away from the base part. The film can sealingly close the opening. Thus, for example the penetration of moisture through the opening can be prevented. In the same manner, the cover film prevents the access from outside, for example to screws after the assembly. The cover film can thereby comprise inscriptions and/or design elements for operating elements and display elements present on the cover part, so that design elements for the cover part can be attached here with a cover film and the opening in the cover part can be simultaneously closed.

The cover film is further preferably bonded to the cover part. This bonding of a film is technically simple to realize and can effect a sealed connection. Moreover, it can prevent the destruction-free access to the screws fixing the electronics housing on the stator housing, if these are covered to the outside by the cover film as described above.

A further preferred embodiment envisages the screws which connect the cover part to the base part not being covered by the cover film. The cover part can thus be removed without damaging the cover film for this. A destruction-free opening of the electronics housing, for example for repair and maintenance or for removing the electronics housing from the stator housing, is thus rendered possible.

Moreover, it is preferable if the at least one screw engages into an inner thread on a wall of the stator housing. With an axial arrangement of the electronics housing on the stator housing, at least one recess can be formed with a corresponding inner thread on the axial side of the stator housing. With a radial-side arrangement, a recess with an inner thread can be formed on a peripheral side of the stator housing. If the stator housing is of metal, such an inner thread can be easily incorporated into the stator housing. Such an inner tread can also be incorporated with a stator housing of plastic. Instead of incorporating a defined inner thread into a recess on the stator housing, one can also use self-cutting screws for fastening. This is particularly the case if the stator housing is manufactured of plastic. The opening in the cover part is preferably aligned with the inner thread or with a hole on the wall of the stator housing. Thus, the mentioned screw on assembly can be inserted through the opening in the cover part, into the mentioned inner thread or hole.

Alternatively to an inner thread or hole, at least one screw bolt can be attached on a wall of the stator housing, and this bolt engages into the electronics housing and is fastened with at least one nut in or on the stator housing. Preferably with the assembly, the nut can be screwed onto the screw bolt, via the mentioned opening in the cover part. As with the previously described embodiment of a screw head, the nut thereby usefully comes to bear on a contact surface in the electronics housing, said surface being way from the stator housing. The contact surface can in particular be designed in the lower part of the electronics housing, so that the lower part is fastened with the screw or with the nut on the stator housing.

Moreover, it is preferable if at least one guide sleeve to be formed in the base part of the electronics housing, through which sleeve the screw extends. On fastening the electronics housing on the stator housing, a screw for example can be screwed through the electronics housing into the stator housing. The preferably tubular guide sleeve thereby on the one hand has the advantage that the screw is led in a defined direction, so that it is aligned in a predefined manner with the inner thread, into which it is to engage. The assembly is simplified by way of this. On the other hand, such a guide sleeve can prevent the screw from damaging parts, for example electrical components, which are situated closely in the electronics housing, when leading the screw through the electronics housing. The guide sleeve can furthermore also be designed such that a contact of a tool with components in the inside of the electronics housing can be prevented.

A particularly preferred embodiment includes the guide sleeve in the base part extending up to the opening in the cover part or to into the opening in the cover part. Thus, the guide sleeve in the interior of the electrics housing preferably extends at least up to the inner side of the cover part or engages from the inner side of the cover part into the opening. At the opposite axial end, the guide sleeve which is preferably designed in an essentially tubular manner extends up to an opening in the base part of the electronics housing, said opening facing the stator and through which a screw or a screw bolt extends to the stator housing. A guide sleeve formed in such a manner guides the screw or a screw bolt in the free space of the electronics housing on assembly, but also disassembly, and can thus prevent a damage of the parts present in the electronics housing, such as the mentioned electrical components, due to the screw or a tool. The extension of the guide sleeve up to or to into the opening can thereby advantageously prevent a screw or a tool for example from slipping for example on insertion into the opening of the cover part, and then being able to get through a gap between the guide sleeve and cover part into the inner region of the electronics housing which contains parts such as electrical components.

Preferably, the screw with a screw head or designed as a nut bears on an axial face side of the guide sleeve. The screw or nut thereby bears on an axial face side which is away from the stator housing, or contact surface of the guide sleeve, and is thus supported on this side of the guide sleeve. The screw or a screw bolt, which is engaged with the nut, at the opposite end of the guide sleeve extends to the stator housing and is fastened on this or engages into an inner thread on the stator housing. Thus, the electronics housing, preferably its lower part, in which the guide sleeve is formed, is fixed on the stator housing by way of the screw or the nut, in particular is held bearing on the stator housing without play. The guide sleeve is preferably a part of the base part of the electronics housing in particular is integrally formed with this or is designed as one piece with this, and ends at an opening in the base part of the electronics housing, said opening facing the stator housing.

Further preferably, the screw does not project beyond the face side of the cover part which is away from the base part. Thus, the outer side of the cover part which is away from the base part can be covered by a plane cover film, by which means the openings or holes which are situated below this cover film, and the screws arranged in these openings or holes are not visible from the outside. Thus, a smooth or plane outer side of the cover part is created.

Further preferably, at least one circuit board is arranged in the electronics housing, and this circuit board comprises at least one recess which lies opposite the screw in the direction of its longitudinal axis or through which the screw extends. As described, the screw serves for fastening the electronics housing on the stator housing. The circuit board extends preferably parallel to the base of the electronics housing, said base facing the stator housing. Further preferably, an outer surface of the cover part also extends preferably parallel to the circuit board. The at least one recess in the circuit board ensures that even when the circuit board is assembled, a screw is accessible from the outside, i.e. in particular through an opening in the cover part, for fixing the electronics housing on the stator housing. For this, the screw can extend through the recess in the circuit board or however be situated aligned to the recess such that a screw tool can engage the screw through the recess in the circuit board. Thus, a circuit board can preferably largely fill out the interior of the electronics housing and despite this ensure the necessary accessibility of the screw, which is necessary, in order to be able to fasten the fully assembled electronics housing on the stator housing. If a guide sleeve as has been described previously is provided, and through which the at least one screw is led, then the guide sleeve thereby departing from the base or the base part can extend up to the circuit board.

With a particularly preferred embodiment, the guide sleeve extends through the recess in the circuit board. This can be advantageous for the positioning as well as also for the prevention of damage to the circuit board due to a screw and/or a tool. Preferably, the guide sleeve can extend through the recess in the circuit board from the base part up to an opening in the cover part or to into the opening in the cover, as has been described previously.

Further preferably, at least one electrical connection, in particular an electric plug connection is present between the stator housing and the electronics housing. The electrical connection between the electronics housing and the stator housing in particular ensures an electrical connection of the stator coils arranged in the stator housing, to the electrical and electronic components in the inside of the electronics housing. Thus, the energy supply of the electric motor in the inside of the stator housing is effected via the electric connection. The electronic components in the electronics housing thereby preferably assume the regulation (closed-loop control) of the drive motor and in particular can comprise a frequency converter. Moreover, it is possible for example to read out current data such as the rotational speed of the rotor and/or temperature, at least of the electric motor and to process it in the electronics housing with regard to data technology and/or to represent display elements in the electronics housing, e.g. on the cover part. The design of the electrical connection as a plug connection is particularly advantageous, since it renders the assembly of the electronics housing onto the stator housing quite simple. The connection of individual cables by way of soldering or clamping can thus be avoided. With regard to the plug connection, the plug-in direction is preferably aligned in the same direction, in which the electronics housing is applied onto the stator housing. Thus, on applying the electronics housing onto the stator housing, an automatic, self-actuating contacting is achieved by way of the plug connection. Preferably, the plug-in direction is thereby directed parallel to the screws or bolts, with which the electronics housing according to the previously described embodiment is screwed to the stator housing.

A further preferred embodiment envisages the pump assembly being designed as a circulation pump assembly, preferably with a wet-running electric motor. The pump assembly can be designed for example as a heating circulation pump.

The invention is hereinafter explained in more detail by way of embodiment examples represented the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a front view of an embodiment of a bracket of the first embodiment of a pump assembly according FIGS. 1 to 4;

FIG. 6 a perspective view of a further embodiment of a bracket of the first embodiment of a pump assembly according to FIGS. 1 to 4;

DESCRIPTION OF THE PREFERRED EMBODIMENTS

Figure 1:
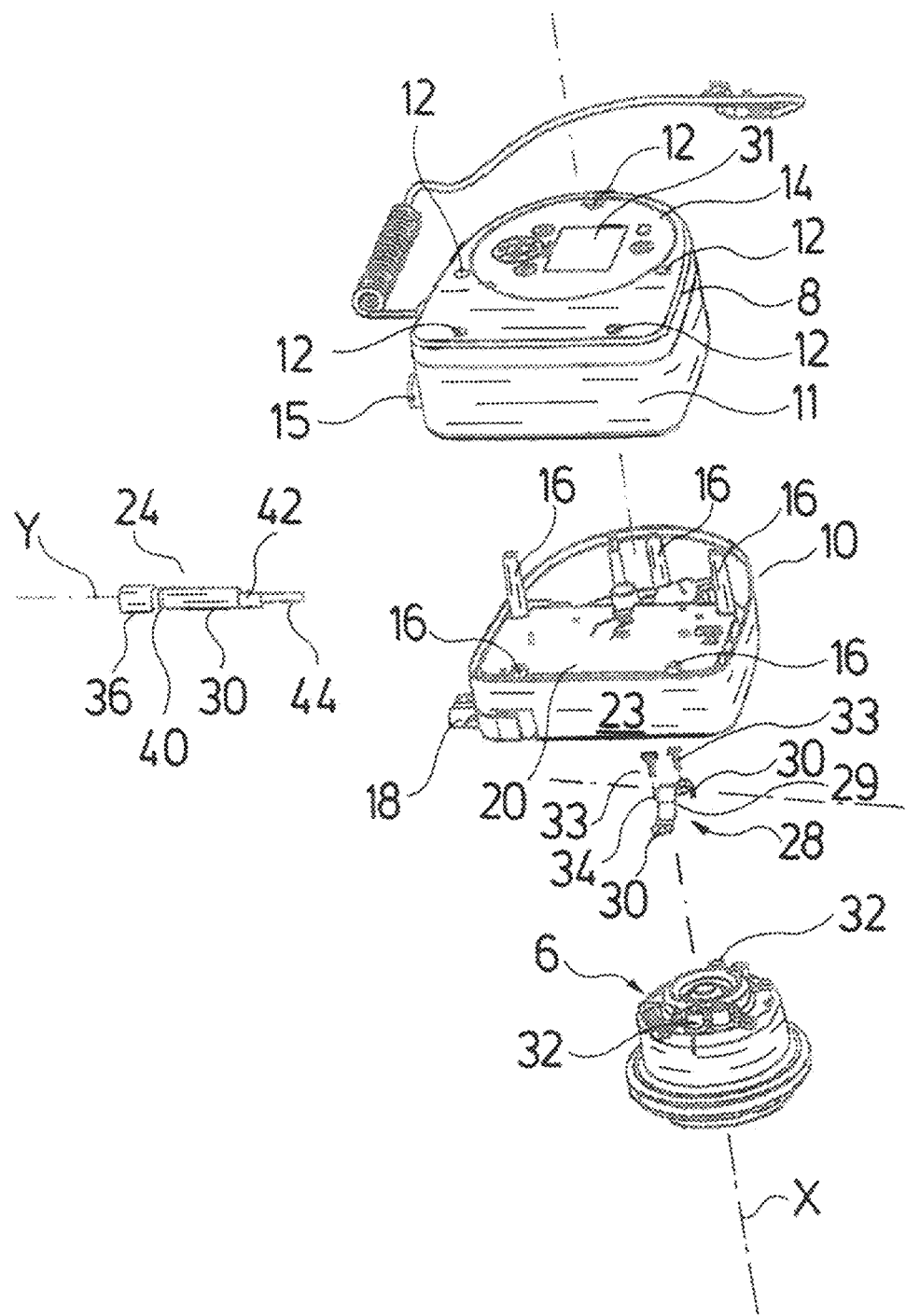
FIG. 1 is an exploded representation of a first embodiment of an electronics housing and of a stator housing of a pump assembly, with a lateral fastening element.

FIGS. 1-4 show a first advantageous embodiment of the invention. The pump assembly 2 designed as a circulation pump with a wet-running electric motor comprises a terminal box or an electronics housing 4 which is connected axially to a stator housing 6 of an electric motor. Axially thereby relates to the longitudinal axis or rotation axis X of the rotor 5 which is arranged in the stator housing 6 of the electric motor. A stator 9 comprising several stator coils is arranged in the inside of the stator housing 6 in a manner surrounding the rotor 5. The stator housing 6 is fastened on a pump housing 3 of the pump assembly 2, and the rotor 5 of the electric motor is connected in a rotationally fixed manner to an impeller 7 which is arranged in the pump housing 3. The electronics housing 4 thereby as a preassembled subassembly consists of a cover part 8 and of a base part 10 which are screwed to one another. The cover part 8 on the upper side which is axially away from the stator housing 6 comprises openings 12 for this, and these openings are arranged distributed along an edge of the cover part 8. The cover part 8 and the base part 10 are screwed to one another via screws 13, wherein the screws 13 engage through the openings 12 of the cover part 8 into fastening sleeves 16 of the base part 10 within the electronics housing 4.

A cover film 14 is located on the upper side of the cover part 8. The cover film 14 is arranged such that none of the openings 12 are covered by the cover film 14 in the assembled condition of the pump assembly 2. For this, a recess which is aligned with one of the mentioned openings 12 is provided in the cover film 14 in this embodiment example, so that this opening 12 too is not covered by the cover film 14. The cover film 14 is preferably bonded to the cover part 8.

In the example shown here, the electronics housing 4 is designed in a three-part manner and it yet comprises an intermediate part 11 between the cover part 8 and the base part 10. The intermediate part 11 comprises an annular outer wall which is aligned with the outer walls peripherally to the longitudinal axis X of the base part 10 and of the cover part 8. The intermediate part 11 thus forms an axial extension of the base part 10, in order to create a greater interior of the electronics housing 4. The intermediate part 11 is fixed between the base part 10 and the cover part 8 on account of the screw connection between the cover part 8 and the base part 10 by way of the screws 13, wherein simultaneously a positive-fit engagement is simultaneously achieved by way of a corresponding contour on the peripheral wall, and this positive-fit engagement prevents a displacement of the cover part 8, of the intermediate part 11 and of the base 10 part relative to one another, transversely to the longitudinal axis X. Preferably, peripheral seals are arranged between the intermediate part 11 and the cover part 8 as well as between the intermediate part 11 and the base part 10, and these seals can be directly molded onto one or more of these parts, in order to seal off the interior of the electronics housing 4.

Preferably, four cable feed-throughs 15 are incorporated on at least one side surface of the intermediate part 11. The base part 10 on its lateral outer wall between the cable feed-throughs 15 and the stator housing 6 comprises an electrical connection 18 which is sealed to the interior of the electronics housing 4. The electrical connection 18 serves for the connection to a mains connection lead for the electricity supply of the pump assembly. The cable feed-throughs 15 serve for the connection of external components such as sensors for example, to the electronics in the inside of the electronics housing 4. The intermediate part 11 represents an optional extension of the electronics housing 4. I.e. the base part 10 and the cover part 8 are designed such that they can also be connected directly to one another, without the intermediately lying intermediate part 11. Thus, one can create a smaller electronics housing, for example in the case that less electronic components, for example for the communication with external components such as sensors for example, are to be arranged in the electronics housing 4. Thus, a modular construction is created, which permits an optional extension of the electronics housing 4 for additional functions. At least one circuit board 20 is arranged within the base part 10. The circuit board 20 extends normally to the longitudinal axis X, i.e. parallel to the axial outer side of the cover part 8 and to the base of the base part 10 which faces the stator housing 6.

An indentation or deepening 21, into which the axial side of the stator housing 6 which faces the electronics housing 4 engages, is located on the lower side which faces the stator housing 6, or on the base of the base part 10 which faces the stator housing 6. Thus, a positive-fit engagement of the axial end of the stator housing 6 with the base part 10 in the region of its deepening 21 is created. This positive-fit engagement prevents a displacement of the electronics housing 4 transversely to the longitudinal axis X relative to the stator housing 6.

In the embodiment example shown here, the electronics housing 4 is connected to the stator housing 6 by a special fastening element in the form of a locking slide. In this embodiment example, the locking slide is designed as a locking pin or fastening pin 24. This is inserted laterally into the base part 10 of the electronics housing 4, transversely or normally to the longitudinal axis X. For this, the electronics housing 4 on an outer wall or outer walling 23 comprises an opening or an engagement 22. The outer wall 23 is formed on the base part 10 and extends peripherally, essentially parallel to the longitudinal axis X. The longitudinal axis Y of the engagement 22 and of the fastening pin 24 extends radially or normally to the longitudinal axis X and intersects this. The engagement 22 represents the opening of a guide 26 in the base part 10 of the electronics housing 4. The guide 26 is also aligned to the longitudinal axis Y and thus extends transversely to the rotation axis X of the rotor 5. The guide 26 receives the fastening pin 24, so that this is only movable in the direction of its longitudinal axis Y and in a manner rotatable about this axis in the guide 26. A movement transverse to the longitudinal axis Y is essentially ruled out by the guide 26.

The fastening pin 24 as a fastening element is situated within the outer contour of the electronics housing 4. It does not project outwards beyond the outer wall 23 which defines the outer contour. It is also accessible from the outer side of the electronics housing 4 when the electronics housing 4 is closed, which is to say when the base part 10 is screwed to the cover part 8, on account of the lateral incorporation or attachment.

Figure 3:
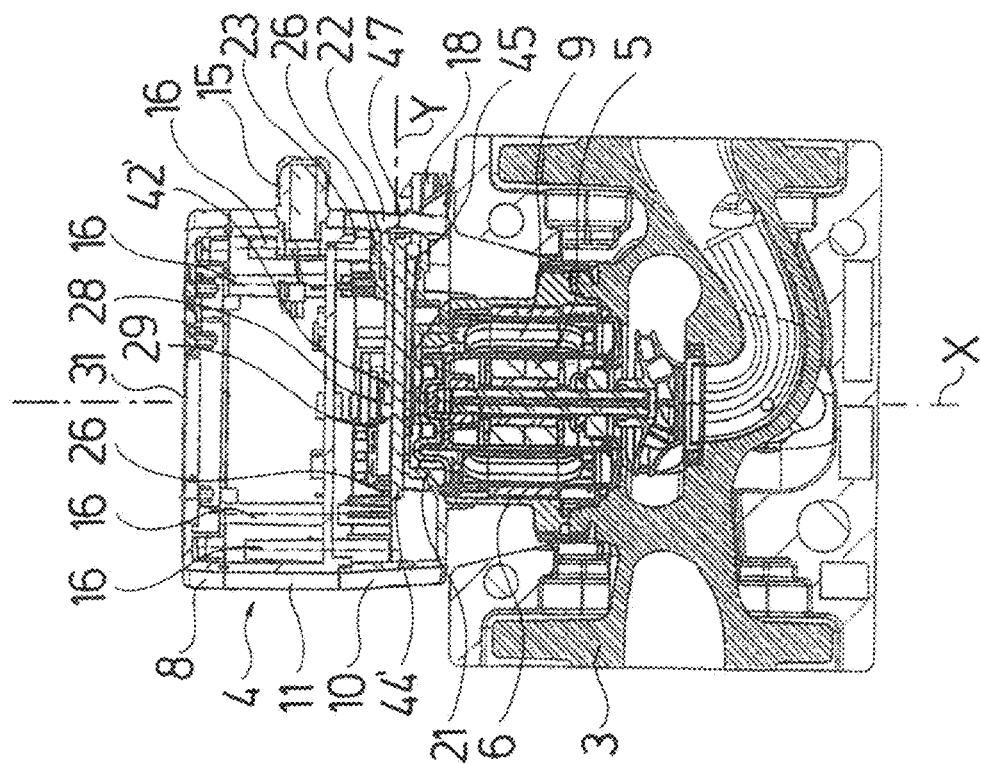
FIG. 3 is a section of the pump assembly according to FIG. 2, along the section line III in FIG. 2.
Figure 2:
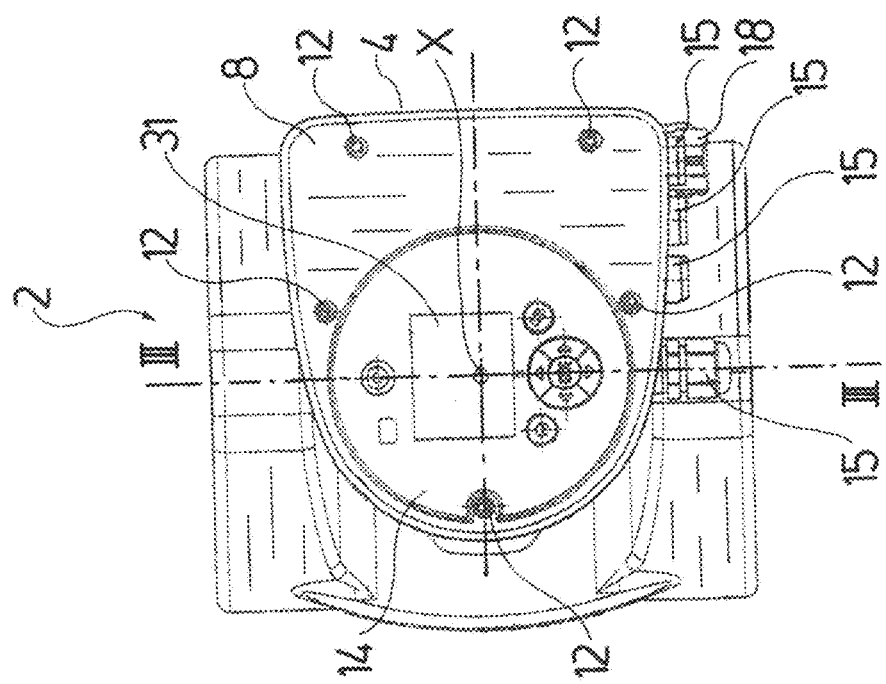
FIG. 2 is a plan view of a pump assembly with the electronics housing, according to FIG. 1.
Figure 4:
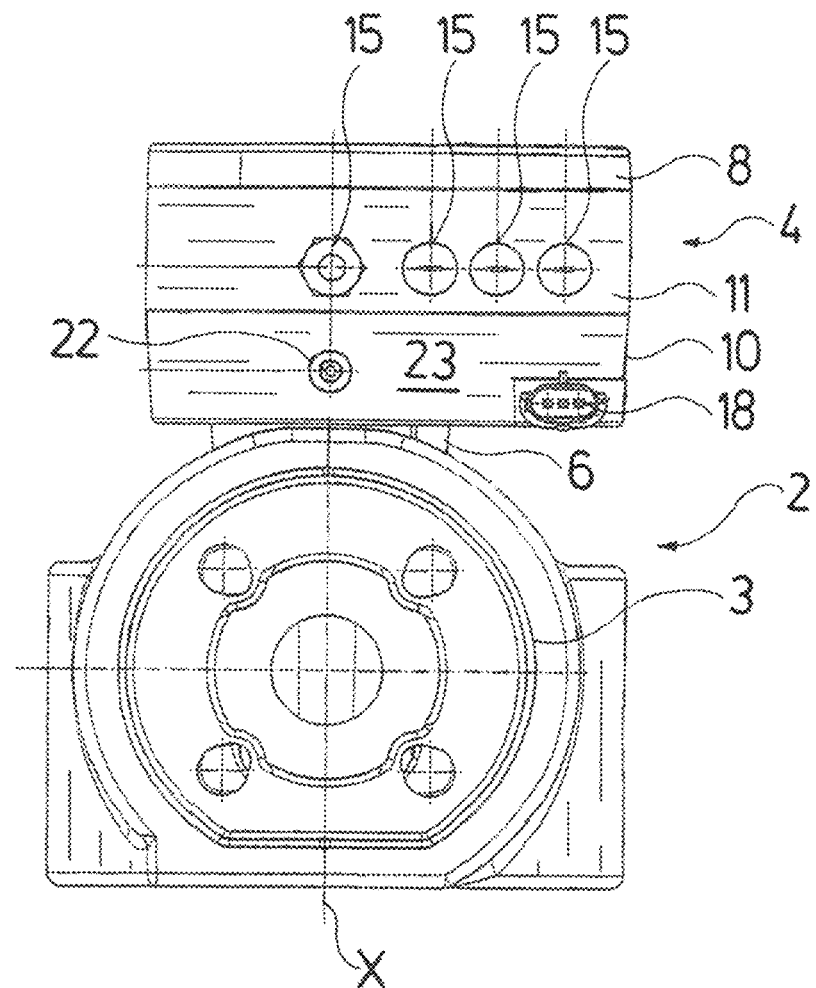
FIG. 4 is a lateral view of the pump assembly according to FIGS. 2 and 3.

The guide 26 for the fastening pin 24 and the deepening 21 in the base part 10 for the axial side of the stator housing 6 form a common free space, into which a sheet-metal piece shaped as a bracket 28 engages. The bracket 28 is fastened on the stator housing 6 and defines or surrounds a recess or opening 29. This opening 29 is aligned with the guide 26 in the lower part 10 of the stator housing, when the electronics housing 4 is applied onto the axial end of the stator housing 6 in the shown manner, so that the fastening pin 24 is applied laterally into the guide 26 and thereby can be led through the opening 29, as is shown in FIG. 3. The bracket 28 between its two longitudinal ends is shaped in an arched manner in its profile, in order to form the opening 29. At its two longitudinal ends, the bracket 28 is bent such that plane clamping surfaces 30 are formed. Thereby, the clamping surfaces 30 extend on both longitudinal ends in a common plane normally to the longitudinal axis X. The clamping surfaces 30 serve for the fixation of the bracket 28 on the stator housing 6 and bear on threaded holes 32 which are recessed on the stator housing 6 preferably on the axial side. The clamping surfaces 30 each have a hole which is flush with one of the threaded holes 32 on the stator housing 6. Screws 33 engage through the mentioned holes in the longitudinal ends or clamping surfaces 30 of the bracket 28, into the threaded holes 32 of the stator housing 6 and thus screw the bracket 28 to the stator housing 6. The arch-like protuberance 34 of the bracket 28 projects away from the stator housing 6 and engages into the mentioned recess 21 in the base part 10 of the electronics housing 4 in the assembled condition of the stator housing 6 and the electronics housing 4. The protuberance 34 forms the recess or opening 29. The opening 29 seen in the axial direction X represents an undercut, behind which the locking slide in the form of the fastening pin 24 guided in the guide 26 of the base part 10 engages in the axial direction X. If the fastening element 24 is inserted into the guide 26 and engages through the opening 29 in the bracket 28, consequently the electronics housing 4 is fixed on the stator housing 6 in the axial direction X.

A particular embodiment of the bracket 28' is shown in FIG. 5. Apart from the arch-shaped protuberance 34' of the bracket 28', the sheet-metal part in profile is additionally shaped in a corrugated manner such that two convexly curved circle segments are connected to one another via a concavely curved circle segment, in each case at the two side arches of the protuberance 34'. The protuberance 34' adjacently to its apex is shaped in a purely arched manner and merges in a curved manner into the side arches which are shaped in a corrugated manner with regard to the profile. The transitions from the clamping surfaces 30 at the longitudinal ends to the side arches shaped in a corrugated manner, with regard to profile are straight segments which merge into the clamping surfaces 30 in an arcuate manner and at the other end into the side arches shaped in a corrugated manner. The circle segments thereby have different radii. All transitions on the bracket 28' are shaped in a curved manner, since a breakage can occur at kink locations for example with less force effort than in the curved regions. The corrugated shape of the bracket 28' gives the bracket 28' elasticity or resilient characteristics in the direction of the longitudinal axis X. Thus, the protuberance 34' can shift in the direction of the longitudinal axis X in a manner such that the distance in the axial direction X to the clamping surfaces 30 increases and thus the recess 29 encompassed by the protuberance 34' increases. As is described further below, this can be used, in order to hold the electronics housing 4 in bearing contact on the axial side of the stator housing 6 with a non-positive fit.

A further embodiment of a bracket 28" is shown in FIG. 6. It differs from the embodiment in FIG. 5 by way of the fact that a concave indentation 35 runs along the apex line of the arched protuberance 24". The indentation 35 is open to the outer side, i.e. is away from the opening 29. The indentation forms a projection directed inwards into the opening 29, in the direction of the longitudinal axis X. The indentation 35 is created by way of embossing or shaping the sheet-metal piece, from which the bracket 28" is formed.

The fastening pin 24 consists essentially of four cylinder pieces which are adjacent one another in the direction of the longitudinal axis Y and which differ from one another by way of the length, diameter and arrangement. The head part 36 of the fastening pin 24 forms a first cylinder piece and is characterized by way of the fact that it has the greatest diameter of all present cylinder pieces. A first guide piece 38 as a second cylinder piece and with a diameter which is smaller than the diameter of the head part 36 is located at one of the axial ends of the head part 36, in a manner arranged centrically along the longitudinal axis Y of the fastening pin 24. A peripheral groove 40 is located in the first guide piece 38, in a manner attached adjacent the head part 36. A seal, for example a sealing ring, which seals the electronics housing 4 with the fastening pin 24 at least in a splash-proof manner, can peripherally engage into the groove 40. A bar piece 42 as a third cylinder piece and whose diameter is smaller than the diameter of the first guide piece 38, but at least larger than half the diameter of the first guide piece 38, is arranged on the axial face side of the first guide piece 38 which is away from the head part 36. Moreover, the bar piece 42 is arranged eccentrically on the face side of the first guide piece 38 in a manner such that it is arranged in an aligned manner along an outer line of the first guide piece 38 which extends parallel to the longitudinal axis Y. I.e. the middle axis of the bar piece 42 is offset parallel to the longitudinal axis Y of the guide piece 38 and of the head part 36. Moreover, the length of the bar piece 42 corresponds at least to the width of the protuberance of the bracket 34 in the direction of the axis Y normal to the rotation axis X. A second guide piece 44 as a fourth cylinder piece is arranged centrically to the longitudinal axis Y of the head part 36 and first guide piece 38, on the axial face side of the bar piece 42 which is away from the first guide piece 38. The diameter of the second guide piece 44 is thereby selected such that at no location does the second guide piece 44 project in the radial direction beyond the outer wall of the bar piece 42, and the bar piece 42 and the second guide piece 44 are arranged aligned to one another along an outer line which extends parallel to the longitudinal axis Y.

A further embodiment of the fastening pin 24' as is represented in FIG. 3 envisages the four cylinder pieces, preferably of plastic, being integrally formed along a cylinder-shaped core 45, preferably of metal. Such a core with integrally formed parts as a fastening pin 24' provides a high stability and an inexpensive manufacture in comparison to a fastening pin 24 which manufactured completely of plastic or metal. In comparison to the embodiment of the fastening pin 24 in FIG. 1, no groove 40 is arranged in the integrally formed cylinder pieces. A catch profile 47 in the form of a hexagon socket for a tool is admitted at the outer lying axial end of the head part 36', in order to be able to rotate the fastening pin 24' about its longitudinal axis D. The core 45 extends along the longitudinal axis Y and at the axial end of the fastening pin 24' forms the second guide piece 44'.

In one rotation position, the fastening pin 24, 24' can be pushed through the engagement 22 into the guide 36. The head part 36 of the fastening pin 24', in the maximally inserted position of the fastening pin 24' in the direction of the axis Y no longer projects out of the outer contour or outer wall 23 of the base part 10. In the mentioned maximally inserted position, the bar piece 42, 42' is located completely in the opening 29 of the bracket 28, 28', 28". The first as well as the second guide piece 38, 44, 44' are located in the guide 26 with a positive-fit engagement. In the released position, in which the fastening pin 24, 24' is inserted into the guide 26 and the opening 29, the region of the bar piece 42, 42' which projects furthest in the radial direction with respect to the longitudinal axis Y, lies away from the inner side of the arch-like protuberance 34, 34', 34" of the bracket 28, 28', 28", i.e. facing the stator housing 6. The bar piece 42' is clamped with the bracket 28 by way of rotating the fastening pin 24, 24' about its longitudinal axis Y, into a locking position. During the rotation of the fastening pin 24', the eccentrically arranged bar piece 42' rotates from a position, in which is does not bear on the bracket 28, into a position bearing on it, wherein the bar piece 42' bears preferably on the apex line of the arch-shaped protuberance 34, 34', 34" on the inner side of this protuberance. I.e. in this position, the part of the locking piece 42, 42' which projects radially furthest with respect to the rotation axis Y, bears on the inner side of the protuberance 34, 34', 34" which faces the opening 29. The rotation into the bearing position can also preferably be companied by a force action in the direction of the longitudinal axis X onto the surface of the arch-like protuberance 34, said force being transmitted via the connection of the bracket 28 to the stator housing 6 and well as via the guiding of the fastening pin 24' in the electronics housing 4, onto the stator housing 6 and electronics housing 4. The bracket 28 preferably with respect to the force effect can have a resilient effect in the direction of the axis X, due to the shaping of the bracket 28, as is particularly shown in FIGS. 5 and 6, and its material selection. The electronics housing 4 is thus pressed onto the stator housing 6 by the elastic restoring force produced by the bracket 28, 28', 28". With the embodiment of the bracket 28" with a prominence 35 along the apex line of the arch-like protuberance 34", it is advantageous if the fastening pin 24' on its bar piece 42' comprises an indentation having a positive fit with the prominence, in a manner such that with the bearing contact of the bar piece 42' on the bracket 28", the prominence engages into the indentation and thus effects a locking or holding of the fastening pin 24' in this locked position.

The fastening pin 24' led laterally into the electronics housing 4 provides the advantage that no fastening elements which run in the axial direction X and which with an assembly of the preassembled electronics housing 4 into the stator housing 6 need to be led through the cover part 8 of the electronics housing 4, need to be present in the electronics housing. This permits parts such as electrical components to be able to be arranged within the electronics housing 4 below the cover part without paying particularly attention to the fastening elements or their necessary feed-throughs. Likewise, it is possible to arrange operating elements and/or display elements on the axial outer side of the electronics housing 4 or of the cover part 8, without paying attention with regard to necessary feed-throughs for the fastening elements, or to design the mentioned operating and/or display elements accordingly large. Despite this, here a fastening element is provided in the form of a fastening pin 24, 24', 24" which is situated completely within the outer contour of the electronics housing 4 and despite this is accessible from the outside in a manner such that the electronics housing 4 can be connected to the stator housing 6, in the completely assembled condition.

With the embodiment example shown here, a display 31 is arranged on the cover part 8 in the region of the cover film 14. The display 31 lies essentially centrally with respect to the longitudinal axis X and thus in the region of the axial projection of the face side of the stator housing 6. Thereby, the display 31 has a size which in a projection covers at least the central region of the axial face side of the stator housing 6, essentially however covers a large part of the surface of the axial face side of the stator housing 6 and in particular the region, at which the threaded holes 32 are situated in the axial face side of the stator housing 6. The threaded holes 32 would be used for fastening a conventional electronics housing by way of screws. Here however, it would not be possible to screw fastening elements through the cover part 8 into the threaded holes 32, due to the size of the display 31. Despite this, a secure fastening of the electronics housing 8 on the stator housing 6 is possible due to the arrangement of the fastening element in the form of the fastening pin 24, which is introduced from the side.

The bracket 28, 28', 28" with its clamping surfaces 30 is screwed on the threaded holes 32 of the stator housing 6 which can alternatively be used also for the direct screw connection of a terminal box or electronics housing. I.e. an electronics housing can also be fastened onto this stator housing 6 in a conventional manner, with screws which engage through a part of the electronics housing in particular its base part.

Figure 7:
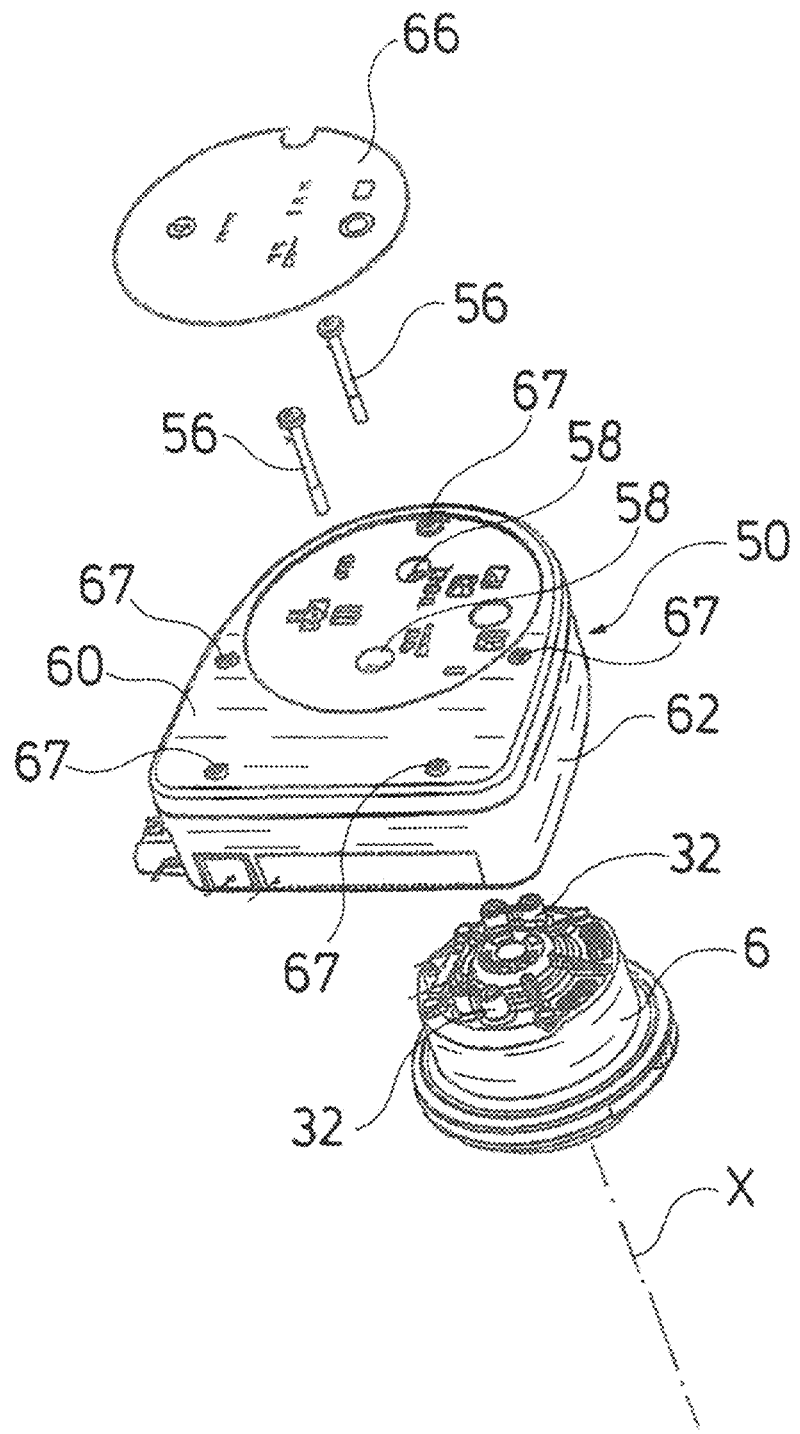
FIG. 7 is an exploded representation of a second embodiment of an electronics housing fastened axially on a stator housing of a pump assembly.
Figure 8:
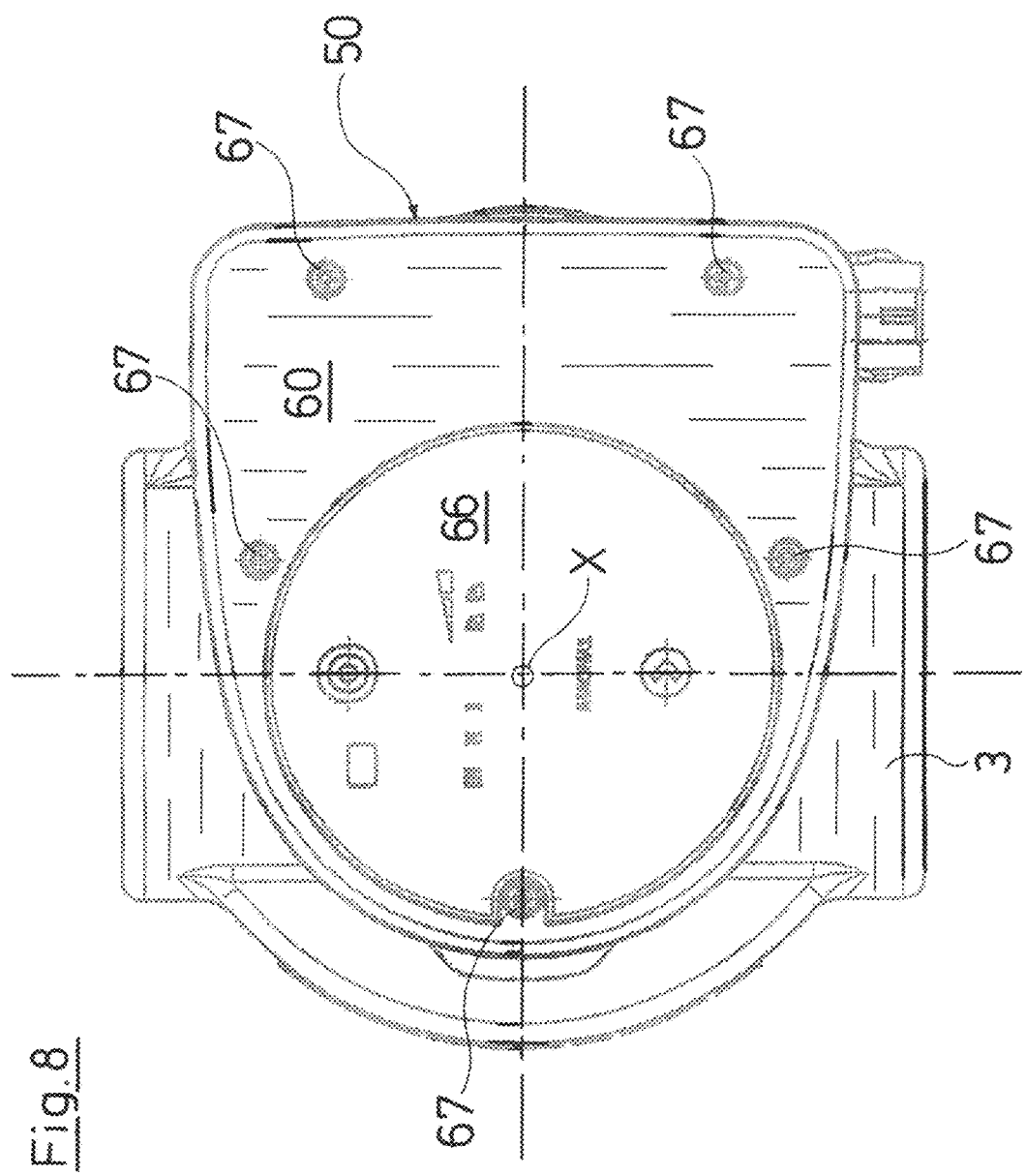
FIG. 8 is a plan view of a pump assembly with an axially fastened electronics housing according to FIG. 5.
Figure 9:
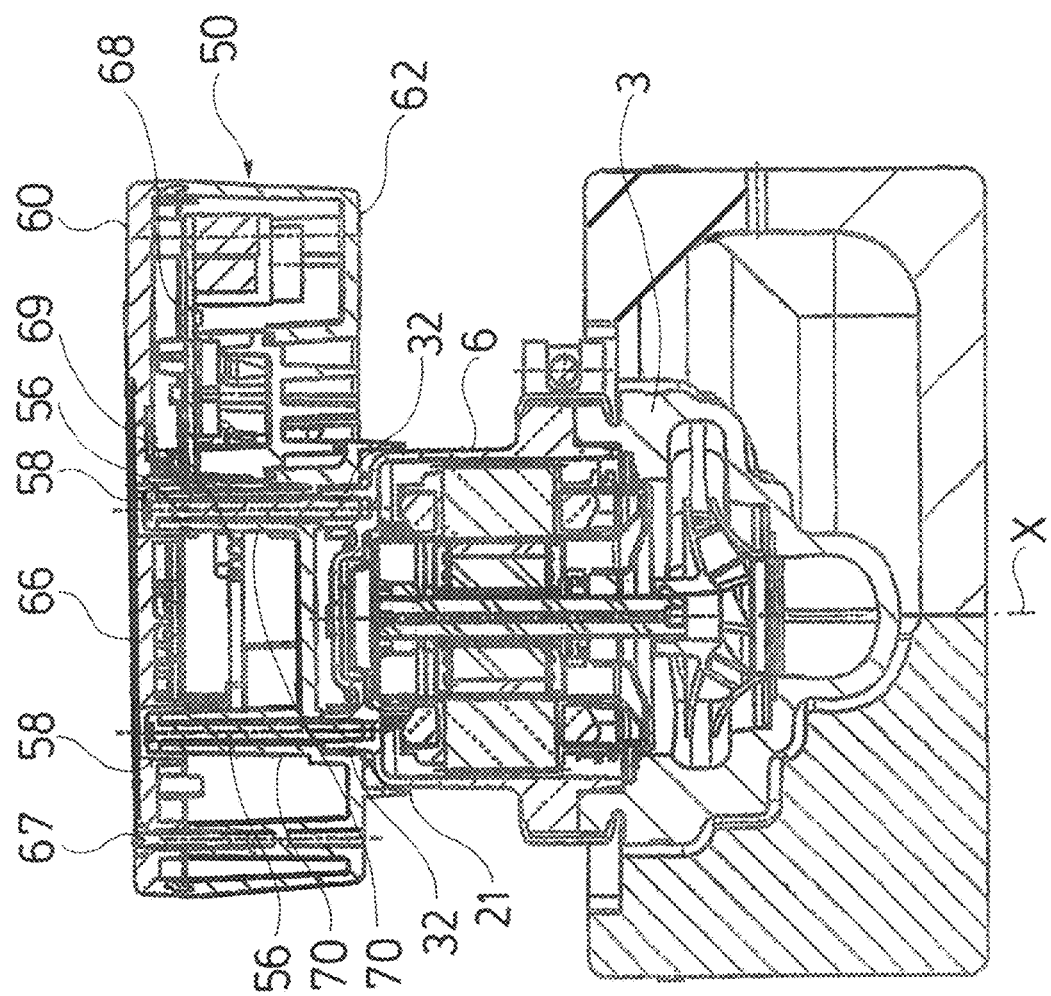
FIG. 9 is a section of the pump assembly according to FIG. 4, along the section line VII in FIG. 6.

A second advantageous embodiment is shown in the FIGS. 7-9. Whereas in the first embodiment the fastening between the electronics housing 4 and the stator housing 6 is realized via a fastening element in the form of a fastening pin 24 introduced laterally into the electronics housing 4, with the present embodiment, the fastening of the electronics housing 50 which as a preassembled subassembly consist of a cover part 60 and a base part 62, is realized axially on the stator housing 6 via two fastening screws 56. The fastening screws 56 form fastening elements which engage through two openings 58 in the cover part 60 of the electronics housing 50, into the electronics housing 50, and screw the base part 62 to the stator housing 6 in the axial direction X. The fastening screws 56 thereby engage into the threaded holes 32 in the stator housing 6 which are arranged diametrically oppositely seen from the axial side with respect to the middle axis X of the stator housing 6. The stator housing 6 with the threaded holes 32 thereby corresponds to the design of the stator housing 6 which was described by way of the first embodiment example in FIGS. 1 to 6.

The openings 58 on the upper side of the cover part 60 are located in a region which after assembly of the electronics housing 50 onto the stator housing 52, is covered by a cover film 66. This is sealingly bonded to the cover part 60. Thus, the openings 58 after the insertion of the fastening screws 56 are sealingly closed to the outer side by way of the cover film 66. Thus, the access to the fastening screws 56 is prevented by the cover film 66, in the assembled condition of the pump assembly 54.

The cover part 60 is connected to the base part 62 via screws 67, wherein the screws 67 at the axial face side of the cover part 60 are arranged close to the outer periphery in a manner distributed over the periphery. The design of the cover part 60 and the arrangement and design of the screws 67 here corresponds to the design of the cover part 8 as well as of the screws 13 in the first embodiment example described by way of FIGS. 1 to 6, so that the above description is referred to with regard to this. The cover film 66 on its outer edging comprises a recess which is aligned to one of the screw guides for a screw 67. Thus, the cover film 66 does not cover the heads of the screws 67. Thus, there exists the possibility of releasing the cover part 60 with the cover film 66 from the base part 62 by way of releasing the screws 67. The electronics housing 50 can thus be opened for repair or maintenance purposes for example. Moreover, the removal of the cover part 60 also after attachment of the cover film 66 permits an access to the fastening screws 56 in the inside of the electronics housing 50.

A circuit board 68 with electronic components is arranged within the electronics housing 50. Moreover, guide sleeves 70 are formed in the inside of the base part 62. The guide sleeves 70 are arranged axially on the base part 62 and are molded to this as one piece. Viewed from above, the guide sleeves 70 are aligned to the openings 58 in the cover part 60. Thereby, the guide sleeves 70 departing from the base of the base part 62 extend up to the cover part 60. Thereby, the guide sleeves 70 with their free ends engage into the openings 58 from the inner side of the electronics housing 50. The fastening screws 58 with their heads bear on the axial face sides of the tubular guide sleeves 70, whilst the shanks of the screws 56 extend through the guide sleeves 70 into the threaded holes 32 of the stator housing 6 and engage into these. Thus, the electronics housing 50 is pressed axially against the axial face side of the stator housing 6. Thereby, the stator housing 6 with its axial face-end, as described by way of the first embodiment, engages with a positive fit into a deepening 21 which is formed by a collar and is on the outer side of the base of the electronics housing 50, said outer side facing the stator housing 6. The engagement into the deepening 21 effects a positive fit in the direction transverse or radial to the longitudinal axis X, so that a lateral displacement of the terminal box is prevented. Moreover, a sealed bearing contact of the electronics housing on the stator housing 6 can be achieved via the peripheral wall of the deepening 21, for which a seal can be arranged, preferably molded, on the periphery of the deepening 21.

As is to be recognized in FIG. 9, the guide sleeves 70 with regard to their length are designed such that the screw heads of the fastening screws 56 which bear on the axial face sides of the guide sleeves 70, do not project axially beyond the outer side of the cover part 60, so that the outer side of the cover 60 can be closed in an aligned and sealed manner by way of the plane cover film 66.

With this second embodiment too, the fastening elements in the form of fastening screws 56 lie completely within the outer contour of the electronics housing 50. Moreover, as long as the cover film 66 is not bonded onto the cover part 60, they are accessible from the outer side of the electronics housing 50, even if the cover part 60 is screwed with the screws 67 to the base part 62. This allows the electronics housing 50 to be firstly completely assembled, as the case may be to be tested and then in the completely assembled, closed condition, to be screwed onto the stator housing 6 by way of the fastening screws 56. Subsequently, the cover film 66 is then bonded onto the cover part 60 and thereby the openings 58 are closed. Despite this, the base part 62 with the components arranged therein, in particular with the circuit board 68, remains connected to the stator housing 6 in a fixed manner if, at a later stage, the cover part 60 is removed by way of releasing the screws 67, since the fastening screws 56 only engage on the base part 62. However, after removal of the cover part 60 then the base part 62 can be released again from the stator housing 6 also by way of releasing the fastening screws 56.

What is essential with this embodiment example is the fact that no components whatsoever are arranged in the inside of the electronics housing 60 above the heads of the fastening screws 56, so that these are accessible also in the assembled and closed condition of the electronics housing 50, as long as the cover film 66 is not applied. With this embodiment, one of the guide sleeves 70 extends through a recess 69 on the edge of the circuits board 68, i.e. here the guide sleeve 70 intersects the circuit board 68. The guide sleeve 70 thereby ensures that the circuit board 68 cannot be contacted or damaged on applying the screw 56.

While specific embodiments of the invention have been shown and described in detail to illustrate the application of the principles of the invention, it will be understood that the invention may be embodied otherwise without departing from such principles.

The invention claimed is:

1. A pump assembly comprising:
an electric motor;
a stator housing and an electronics housing fastened at the outside on the stator housing; and
at least one fastening element, wherein the electronics housing is connected to the stator housing via said fastening element, said fastening element being situated within an outer contour of the electronics housing which outer contour is delimited by the outer walls of the electronics housing and being accessible with a closed electronics housing, the electronics housing comprising at least one base part and a cover part, the at least one fastening element being arranged such that the cover part is releasable from the base part independently of the fastening element, the base part being fastened with at least one screw as a fastening element, on the stator housing, and the cover part comprising at least one opening lying opposite the screw in the direction of the longitudinal axis of the screw, wherein the space between the screw and the opening is free.

2. A pump assembly according to claim 1, wherein the electronics housing comprises a base surface which on at least one side extends beyond an outer contour of the stator housing and is larger than an adjacent outer side of the stator housing.

3. A pump assembly according to claim 1, wherein the electronics housing is fastened axially on the stator housing.

4. A pump assembly according to claim 1, wherein the cover part and the base part of the electronics housing are screwed to one another.

5. A pump assembly according to claim 1, wherein the opening in the cover part is covered by a cover film arranged on a side of the cover part which is away from the base part.

6. A pump assembly according to claim 5, wherein the cover film is bonded to the cover part.

7. A pump assembly according to claim 4, wherein screws which connect the cover part to the base part are not covered by the cover film.

8. A pump assembly according to claim 1, wherein the at least one screw, with which the base part is fastened on the stator housing, engages into an inner thread on a wall of the stator housing.

9. A pump assembly according to claim 1, wherein at least one guide sleeve is formed in the base part, through which guide sleeve the screw extends.

10. A pump assembly according to claim 9, wherein the guide sleeve in the base part extends up to the opening in the cover part or to into the opening in the cover part.

11. A pump assembly according to claim 9, wherein the screw with a screw head or designed as a nut, bears on an axial face side of the guide sleeve.

12. A pump assembly according to claim 1, wherein the screw does not project beyond the face side of the cover part which is away from the base part.

13. A pump assembly according to claim 1, further comprising at least one circuit board arranged in the electronics housing, said circuit board comprising at least one recess which lies opposite the screw in the direction of its longitudinal axis or through which the screw extends.

14. A pump assembly according to claim 9, further comprising at least one circuit board arranged in the electronics housing, said circuit board comprising at least one recess which lies opposite the screw in the direction of its longitudinal axis or through which the screw extends, wherein:
at least one guide sleeve is formed in the base part, through which guide sleeve the screw extends;
the guide sleeve extends through the recess in the circuit board.

15. A pump assembly according to claim 1, further comprising:
at least one electrical plug connection between the stator housing and the electronics housing.

16. A pump assembly according to claim 1, wherein the pump assembly is designed as a circulation pump assembly with a wet-running electric motor.

* * * * *